United States Patent
Ichikawa

(10) Patent No.: US 8,305,338 B2
(45) Date of Patent: *Nov. 6, 2012

(54) LIQUID CRYSTAL DISPLAY APPARATUS AND BACKLIGHT ADJUSTMENT METHOD

(75) Inventor: Hiroaki Ichikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 419 days.

This patent is subject to a terminal disclaimer.

(21) Appl. No.: 12/631,506

(22) Filed: Dec. 4, 2009

(65) Prior Publication Data

US 2010/0079368 A1    Apr. 1, 2010

Related U.S. Application Data

(63) Continuation of application No. 10/531,369, filed as application No. PCT/JP2004/015956 on Oct. 21, 2004, now Pat. No. 7,652,654.

(30) Foreign Application Priority Data

Dec. 8, 2003    (JP) ................................. 2003-408735

(51) Int. Cl.
*G09G 3/36* (2006.01)

(52) U.S. Cl. ............... 345/102; 345/87; 345/89; 345/98

(58) Field of Classification Search ............ 345/87–100, 345/102, 204, 207

See application file for complete search history.

(56) References Cited

U.S. PATENT DOCUMENTS

| | | | |
|---|---|---|---|
| 5,406,305 A | 4/1995 | Shimomura et al. | |
| 6,188,380 B1 | 2/2001 | Kawashima et al. | |
| 6,636,190 B2 | 10/2003 | Hirakata et al. | |
| 6,791,636 B2 | 9/2004 | Paolini et al. | |
| 6,825,828 B2 | 11/2004 | Burke et al. | |
| 6,870,529 B1 | 3/2005 | Davis | |
| 6,914,389 B2 | 7/2005 | Chang et al. | |
| 7,068,246 B2 | 6/2006 | Yamazaki et al. | |

(Continued)

FOREIGN PATENT DOCUMENTS

JP    64-006927    1/1989

(Continued)

OTHER PUBLICATIONS

Japanese Office Action issued on Aug. 24, 2010 corresponding to Japanese Patent Appln. No. 2005-516064.

*Primary Examiner* — Kimnhung Nguyen
(74) *Attorney, Agent, or Firm* — K&L Gates LLP

(57) ABSTRACT

A liquid crystal display apparatus and backlight adjustment method are provided.

Backlight luminance sensors 111A to 111D are disposed in the vicinity of four outer corners of an effective screen of an LCD panel 121. Each of the backlight luminance sensors 111A to 111D detects the luminance of each of three primary colors. A backlight unit is composed of a three-primary LED array and a light diffusion unit. Transistors of the backlight luminance sensors and transistors of a pixel portion are formed on the same substrate in the same process. When a transistor is irradiated with backlight in its sufficient off region, an off current occurs due to light excitation. Since the value of the off current corresponds to the luminance of the rays of backlight that irradiates the transistor, the luminance of the backlight is detected with an output voltage into which the off current is converted. As a result, the luminance of the backlight is kept constant.

11 Claims, 14 Drawing Sheets

U.S. PATENT DOCUMENTS

| | | | |
|---|---|---|---|
| 7,652,654 B2 * | 1/2010 | Ichikawa | 345/102 |
| 2001/0015711 A1 | 8/2001 | Aoki | |
| 2002/0000969 A1 | 1/2002 | Ozawa | |
| 2002/0011978 A1 | 1/2002 | Yamazaki et al. | |
| 2002/0113192 A1 | 8/2002 | Antila | |
| 2003/0137485 A1 | 7/2003 | Wei et al. | |
| 2003/0227435 A1 | 12/2003 | Hsieh | |
| 2003/0231161 A1 | 12/2003 | Yamaguchi | |
| 2004/0174333 A1 | 9/2004 | Kim et al. | |

FOREIGN PATENT DOCUMENTS

| | | |
|---|---|---|
| JP | SHO 64-006927 | 1/1989 |
| JP | 02-034817 | 2/1990 |
| JP | HEI 02-034817 | 2/1990 |
| JP | 03-153211 | 7/1991 |
| JP | HEI 03-180080 | 8/1991 |
| JP | 03-249622 | 11/1991 |
| JP | HEI 03-249622 | 11/1991 |
| JP | 03-247020 | 12/1991 |
| JP | 03-278023 | 12/1991 |
| JP | HEI 03-274020 | 12/1991 |
| JP | HEI 04-065383 | 3/1992 |
| JP | HEI 05-175580 | 7/1993 |
| JP | 05-232450 | 9/1993 |
| JP | 10-020277 | 1/1998 |
| JP | 10-050124 | 2/1998 |
| JP | HEI 10-050124 | 2/1998 |
| JP | 2000-122574 | 4/2000 |
| JP | 2001-265296 | 9/2001 |
| JP | 2002-072920 | 3/2002 |
| JP | 2002-324685 | 11/2002 |

* cited by examiner

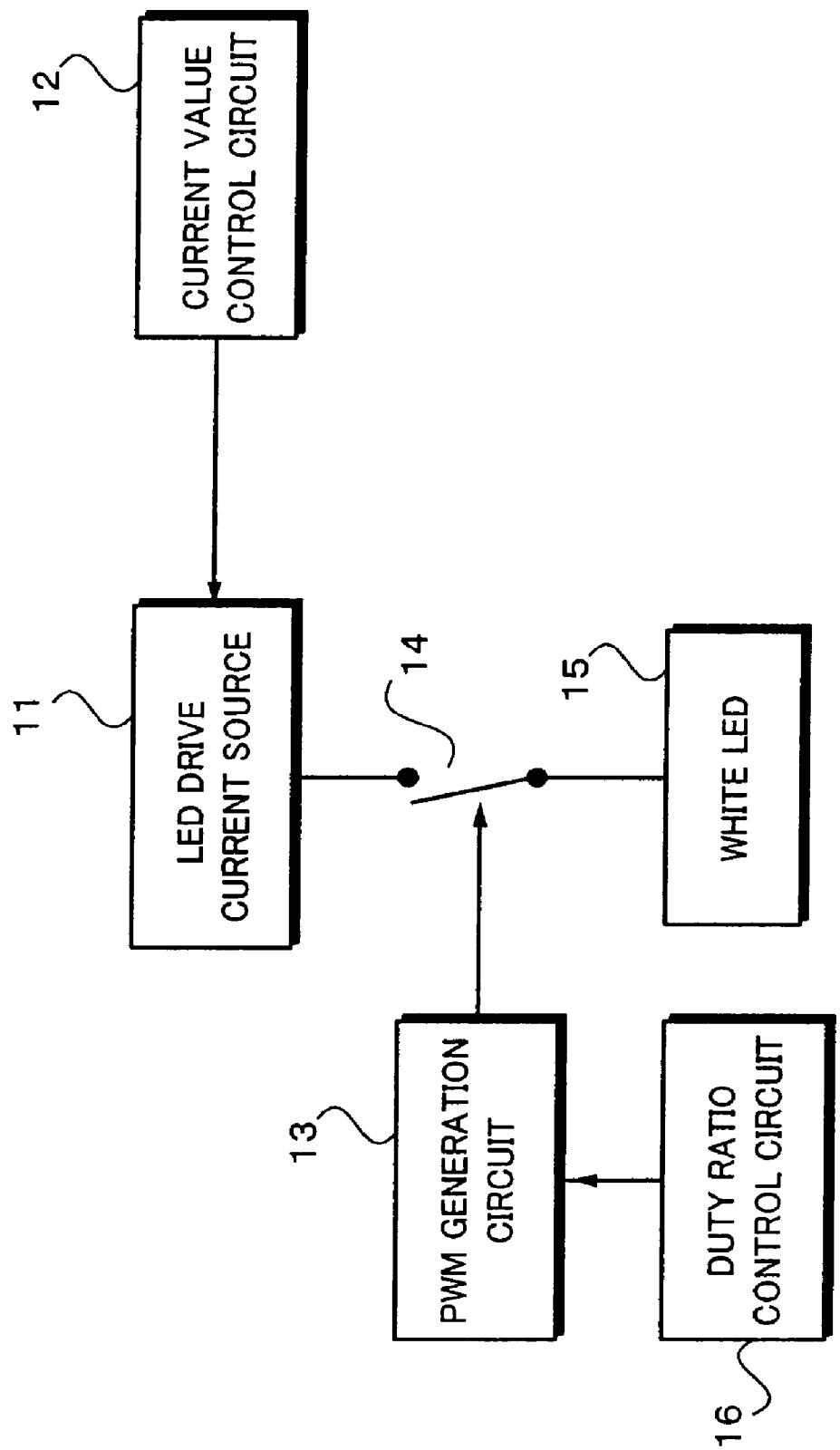

LIQUID CRYSTAL DISPLAY APPARATUS AND BACKLIGHT ADJUSTMENT METHOD

CROSS REFERENCE TO RELATED APPLICATIONS

The present application is a continuation of U.S. patent application Ser. No. 10/531,369 filed on Apr. 14, 2004 which is a National Stage of International Application No. PCT/JP2004/015956 filed on Oct. 21, 2004 which claims priority to Japanese Patent Document No. P2003-408735 filed Dec. 8, 2003, the disclosure of which is herein incorporated by reference.

BACKGROUND

The present invention relates to a liquid crystal display apparatus and a backlight adjustment method.

A liquid crystal display (hereinafter abbreviated as an LCD), which is of non-self emitting type, needs backlight as a light source. Examples of the backlight are a cold cathode ray tube and a light emitting diode (hereinafter abbreviated as an LED). When an LED is used, a white diode can be used. However, in a liquid crystal television monitor, three-primary color LEDs of R (red), G (green), and B (blue) are often used to improve color reproducibility. By mixing these colors of these LEDs, white backlight is formed.

When a white LED is used for backlight, since the luminance and chromaticity of the backlight depend on the current that flows in the LED, the duty of on time and off time of the current that flows in the LED is controlled as disclosed in related art (Japanese Patent Laid-Open Publication No. 2002-324685).

In the related art as shown in FIG. 16, the luminance of backlight for an LCD module is adjusted by controlling current, duty, and so forth. In other words, an output current value of an LED drive current source 11 is controlled by a current value control circuit 12. A switch circuit 14 is disposed between the LED drive current source 11 and a white LED 15. The switch circuit 14 is turned on/off with a PWM signal of a PWM generation circuit 13. The duty ratio of the PWM signal is controlled with a control signal supplied from a duty ratio control circuit 16. However, the luminance of the backlight of the LCD module described in the document deteriorates by aged deterioration or the like.

In the past, when an LCD module was shipped, the luminance of the backlight was adjusted. The luminance of the backlight was controlled by a thermistor as a temperature detection device. Alternatively, the end user needed to adjust the luminance of the backlight.

Thus, after the liquid crystal display had been shipped, the aged deterioration of the luminance of the backlight could not be handled or it was improperly adjusted. Thus, the user needed to adjust the luminance of the backlight.

SUMMARY

The present invention provides in an embodiment a thin type liquid crystal display apparatus and a backlight adjustment method that do not need the user to adjust the luminance of the backlight and that can be adjusted with high accuracy.

The present invention provides in an embodiment a liquid crystal display apparatus having a liquid crystal interposed between two substrates and a backlight as a light source for the liquid crystal, comprising:

a luminance sensor formed on one of the substrates (this substrate is referred to as the first substrate), the luminance sensor and thin film devices as pixels being formed on the first substrate in the same process, the luminance sensor that detects the luminance of the backlight; and a control circuit that generates a drive signal that keeps the luminance of the backlight almost constant on the basis of a detection signal detected by the luminance sensor.

The backlight includes in an embodiment a light emitting device array and a diffusion portion, the light emitting device array being an arrangement of repetition of at least three color light emitting devices, the diffusing portion that diffuses color rays emitted from the light emitting device array and generates white light.

Alternatively, the backlight includes in an embodiment a light emitting device array, a diffusion portion, and a light guide portion, the light emitting device array that is an arrangement of repetition of at least three color light emitting devices in a line shape, the diffusion portion that diffuses color rays emitted from the light emitting device array and generates white light, the light guide portion that equally guides the color rays emitted from the light emitting device array to the entire surface of the diffusion portion.

Alternatively, the present invention includes in an embodiment a luminance adjustment method for backlight as a light source of white light that is a mixture of rays emitted from an arrangement of repetition of at least three-color light emitting devices disposed on a liquid crystal display panel, thin film devices being formed as a screen on the liquid crystal display panel, a luminance sensor being disposed on the liquid crystal display panel, comprising the steps of: detecting luminance of the backlight; generating a drive signal on the basis of the detected result at the first step; and driving at least three-color light emitting devices with the drive signal generated at the second step and keeping the luminance of the backlight almost constant.

According to this aspect in an embodiment, since luminance sensors and pixel transistors of the LCD are formed in the same process, a thin type LCD panel unit can be produced. In addition, the luminance of the backlight can be kept constant.

The luminance sensor detects an output voltage into which an off current due to light excitation corresponding to luminance of light emitted from the backlight is converted in the state that a thin film device that composes the luminance sensor is sufficiently turned off. The liquid crystal display apparatus further comprises an input signal generation portion that generates an input signal having a repetitive period that is shorter than a period for which the liquid crystal transmits light and that the user does not recognize as flickering, the input signal generation portion that supplies the input signal to the thin film device that compose the luminance sensor; a sample hold portion that sample-holds a detection signal of the luminance sensor; and a control circuit that generates a drive signal that keeps the luminance of the backlight almost constant on the basis of a signal sample-held by the sample hold portion. The sample hold portion is formed on the first substrate on which thin film devices are formed.

According to this aspect in an embodiment, when a light insulation portion can not be disposed in a substrate opposite to a substrate on which thin film devices are formed or when a frame portion that shields luminance sensors cannot be disposed, since a potential that causes the sensor portion to sense the luminance of the backlight for a short time that the observer cannot recognize and that causes it to appear to be black in the rest of the time is applied to the sensor portion, even if the substrate on which the thin film devices are formed is disposed on the backlight side, the luminance of the backlight can be detected so that the observer does not recognize the sensor portion.

The liquid crystal display apparatus according to an embodiment the present invention can keep the luminance of the backlight constant even if the aged deterioration takes place in the liquid crystal display apparatus.

According to the present invention in an embodiment, the luminance detection means of the backlight can be disposed on the substrate for the pixel transistors of the LCD. In addition, the luminance detection means can be formed in the process for the pixel transistors. Thus, the cost of the sensors can be decreased. In addition, since the sensors can be formed in the LCD module, it can be thinned.

Additional features and advantages of the present invention are described in, and will be apparent from, the following Detailed Description of the Invention and the figures.

BRIEF DESCRIPTION OF THE FIGURES

FIG. 16 is a block diagram showing an example of a backlight luminance adjustment apparatus according to related art.

DETAILED DESCRIPTION

The present invention relates to a liquid crystal display apparatus and a backlight adjustment method.

Next, with reference to the accompanying drawings, an embodiments of the present invention will be described. Before that, a typical structure of a liquid crystal display apparatus will be described.

Figure 1A:
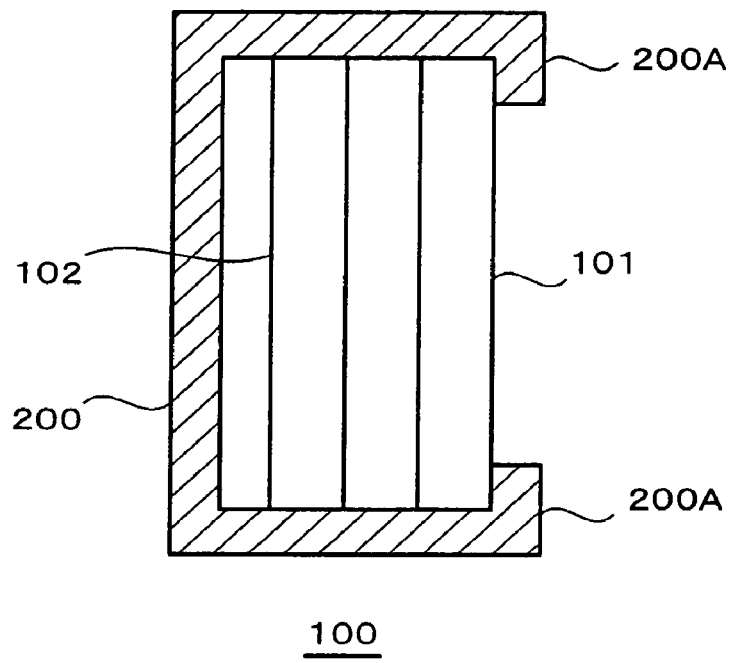
FIG. 1A is a sectional view showing an outlined structure of an LCD display apparatus, FIG. 1B being a plan view showing an outlined structure of the LCD display apparatus.
Figure 1B:
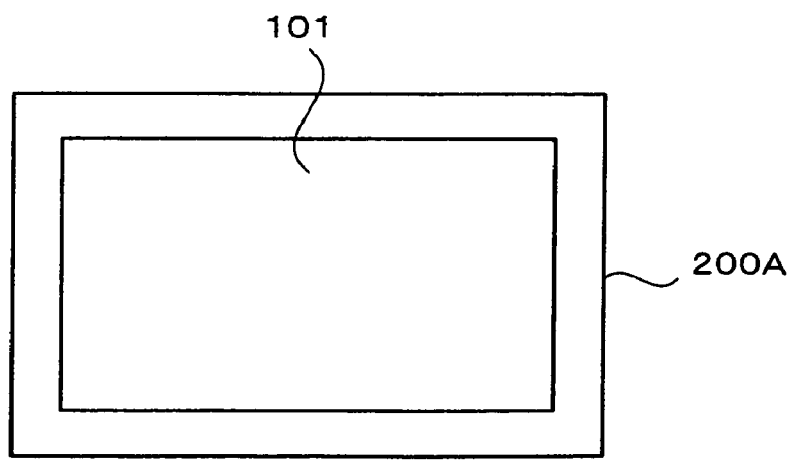

As shown in FIG. 1A and FIG. 1B, a liquid crystal display apparatus 100 is composed of an LCD panel unit 101 and a backlight unit 102. In addition, a circuit for a control system is also disposed in the liquid crystal display apparatus 100. These units are housed in a housing 200. Reference numeral 200A represents a frame portion that surrounds a screen of the housing 200.

Figure 2:
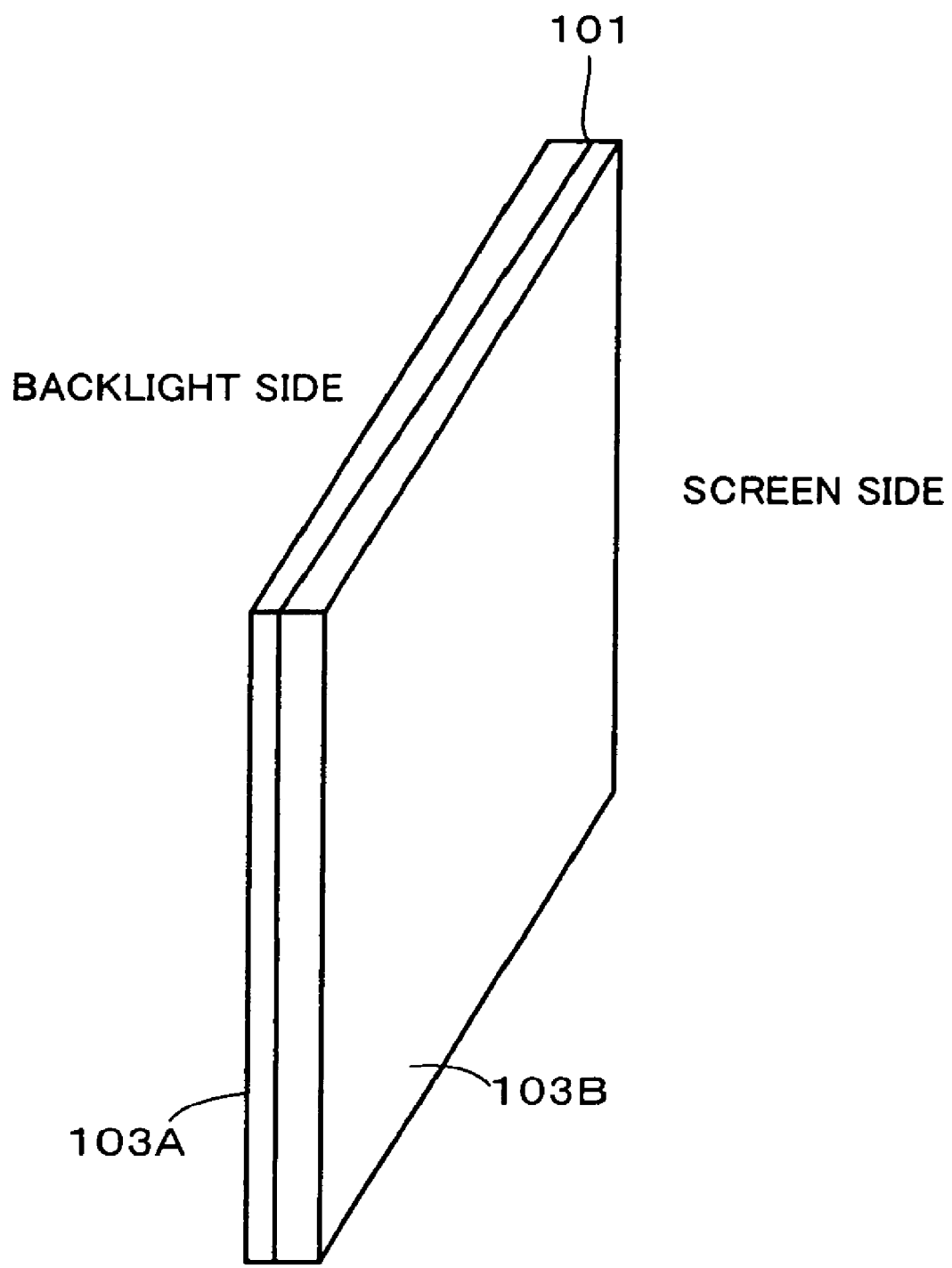
FIG. 2 is a perspective view showing an outlined structure of an LCD panel unit.

As shown in FIG. 2, the LCD panel unit 101 is composed of two substrates 103A and 103B that are layered. The LCD panel unit 101 is a thin film transistor (TFT) liquid crystal. The TFT is categorized as an amorphous silicon type and a polysilicon type. The amorphous silicon type uses an amorphous material for a substrate. The polysilicon type uses a polysilicon material for a substrate.

In FIG. 2, reference numeral 103A represents a backlight side substrate. Reference numeral 103B represents a screen side substrate. In the TFT liquid crystal, two substrates are oppositely disposed and a liquid crystal material is interposed therebetween. One substrate is a TFT side substrate on which TFTs and so forth are formed on a glass substrate. The other substrate is an opposite side substrate on which a color filter and so forth are disposed. A backlight luminance sensor, which will be described later, is formed on the TFT side substrate.

As the substrate 103A shown in FIG. 2, an opposite side substrate is disposed. As the substrate 103B, a TFT side substrate is disposed. The relationship of this arrangement is referred to as pattern A. Alternatively, as the substrate 103A, a TFT side substrate may be disposed. As the substrate 103B, an opposite side substrate may be disposed. The relationship of this arrangement is referred to as pattern B. The present invention can be applied to any one of these arrangements.

Figure 3:
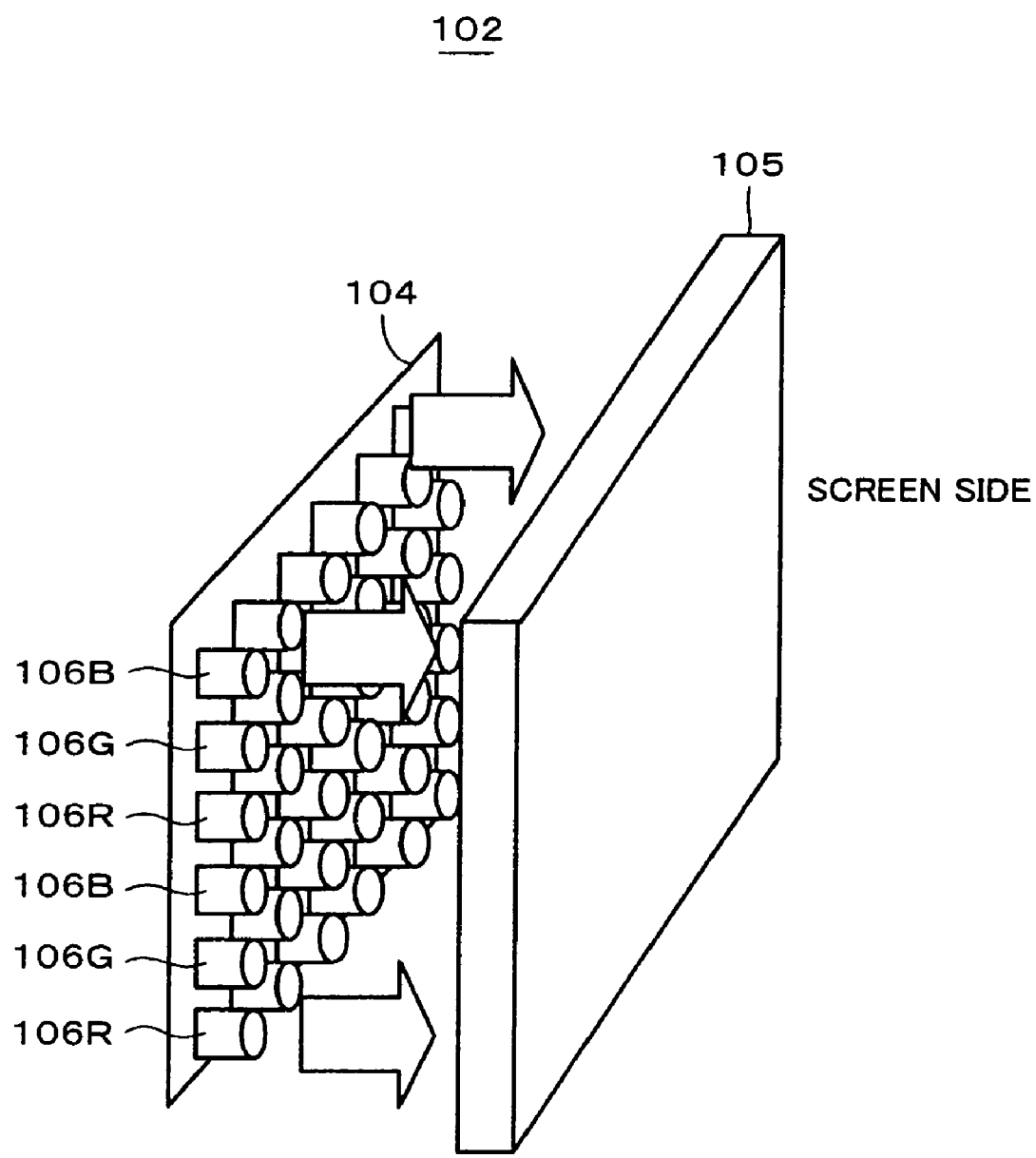
FIG. 3 is a perspective view showing an outlined structure of an example of the LCD panel unit.

FIG. 3 shows an example of the backlight unit 102. Reference numeral 104 represents a three-primary color LED array. Reference numeral 105 represents an optical diffusion unit. The LED array 104 is composed of a repetition of a horizontal array of blue LEDs 106B, a horizontal array of green LEDs 106G, and a horizontal array of red LEDs 106R. The three-primary colors of the LEDs 106B, 106G, and 106R are diffused by the optical diffusion unit 105. As a result, the optical diffusion unit 105 generates white color backlight.

Figure 4:
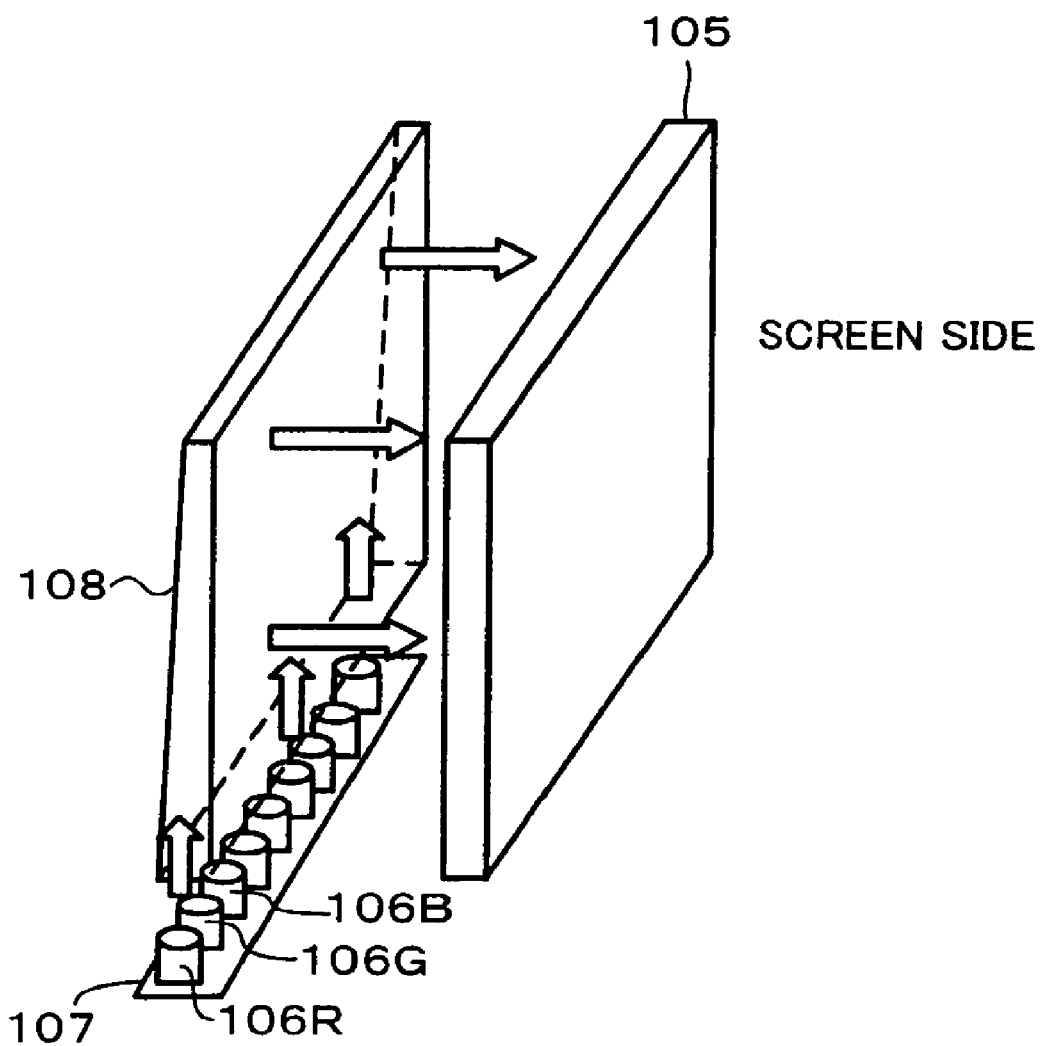
FIG. 4 is a perspective view showing an outlined structure of another example of the backlight unit.

FIG. 4 shows another example of the backlight unit 102. An LED array 107 is composed of red LEDs 106R, green LEDs 106G, and blue LEDs 106B that are alternately arranged in a line shape. The LED array 107 is disposed on the lower end side of a light guide plate 108. The light guide plate 108 equally transmits light of each LED of the LED array 107 to the entire surface of the optical diffusion unit 105. The optical diffusion unit 105 mixes the colors of the light guide plate 108. As a result, the optical diffusion unit 105 generates white color backlight.

In addition to the light emitting devices of three-primary colors, light emitting devices of another color may be used to improve the color reproducibility. The backlight adjustment method according to the present invention is performed by controlling drive signals of light emitting devices of individual colors.

To keep the luminance of the backlight constant, a sensor that measures the luminance of the backlight is needed. When the sensor that measures the luminance of the backlight is disposed in the structure shown in FIG. 3 or FIG. 4, the sensor needs to be disposed in the vicinity of the optical diffusion unit 105. When the luminance of the backlight is actually detected, it is preferred to dispose the sensor on the screen side. However, when the sensor is disposed on the screen side, the sensor shadows the screen. Thus, the sensor cannot be disposed on the screen side.

As a practical arrangement method for the sensor, it may be disposed on a side surface of the optical diffusion unit 105 shown in FIG. 4 or in the space of the backlight unit 102 shown in FIG. 3 and FIG. 4 rather than on the LCD panel unit side. However, when the sensor is disposed on the side surface of the optical diffusion unit 105, the depth of the housing 200 increases by the thickness of the sensor.

In the LCD module that is composed of LEDs of three primary colors shown in FIG. 3 and FIG. 4, unless the sensor receives the completely mixed light, the sensor will recognize incorrect luminance. In other words, when the sensor is disposed on the side surface of the optical diffusion unit 105 or in the space of the backlight unit 102, the sensor needs to receive the mixed light.

According to the present invention, in consideration of the above-described point of view, white light which the backlight unit 102 emits to the LCD panel is detected. In other words, the sensor that detects the luminance of the backlight is disposed in the LCD panel. The sensor detects light with which the inside of the LCD panel is irradiated. Since the LCD panel is irradiated with designed white light of mixed colors, the sensor can receive white right of mixed colors.

According to the embodiment of the present invention, the LCD panel unit 101 has a sensor that detects the luminance of the backlight. In addition, according to the embodiment of the present invention, the backlight luminance sensor and the pixel portion, namely TFTs, of the LCD panel unit 101 shown in FIG. 5 and FIG. 6 are formed in the same process.

Figure 5:
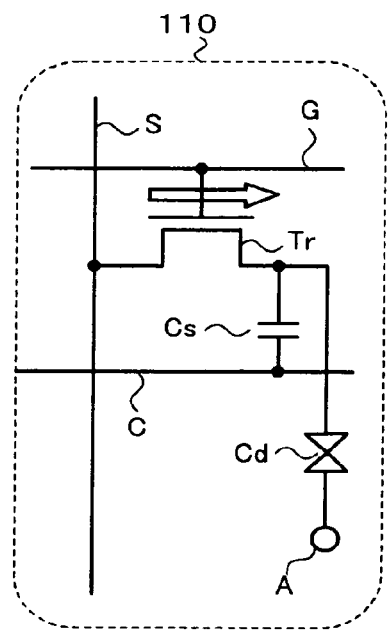
FIG. 5 is a schematic diagram showing connections of an equivalent circuit of one pixel in a write mode.
Figure 6:
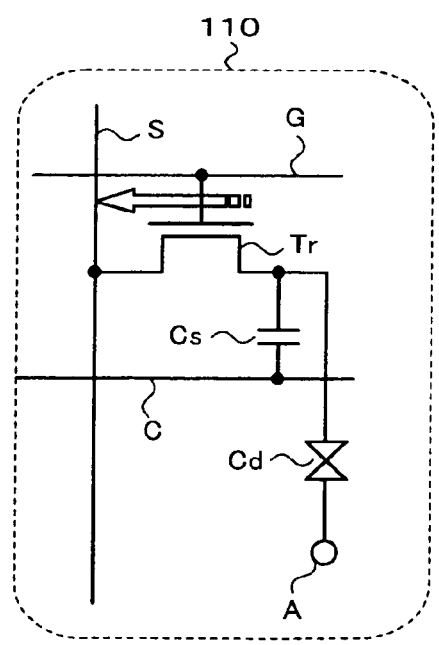
FIG. 6 is a schematic diagram showing connections of an equivalent circuit of one pixel in a hold state.

In FIG. 5 and FIG. 6, reference numeral 110 represents a structure of one pixel of the LCD panel unit 101. Tr represents a pixel transistor that has the same structure as an MOS-FET. G represents a gate line. S represents a source line (also called a data line). Cs represents a capacitor. C represents a Cs line. A gate of the transistor Tr is connected to the gate line G. A source of the transistor Tr is connected to the source line S. The capacitor Cs is connected between a drain of the transistor Tr and the Cs line C. A pixel electrode is connected in parallel with the capacitor Cs. A liquid crystal capacity Cd exists between the drain of the transistor Tr and an opposite electrode A. In FIG. 5 and FIG. 6, the transistor Tr is composed of an N channel type transistor. Alternatively, the transistor Tr may be composed of a P channel type transistor. Next, in the following description, it is assumed that the transistor Tr is composed of an N channel type transistor.

FIG. 5 shows an equivalent circuit of the pixel 110 in a write state. Since signals are supplied to both the gate line G and the source line S, the pixel becomes active. A potential of the signal supplied through the source line S is written to the pixel through the pixel transistor Tr. When the pixel transistor Tr is turned on and a current flows between the drain and the source of the transistor Tr, the liquid crystal capacitor Cd and the capacitor Cs are charged.

FIG. 6 shows an equivalent circuit of the pixel 110 in the state that a minus potential is supplied to the gate line of the transistor Tr and the transistor Tr is turned off (hold state). When an off current flows in the pixel transistor Tr through the gate line G, the pixel transistor Tr is turned off. The capacitor Cs, which is an auxiliary capacitor, holds the written signal potential until the next signal is written.

Figure 7:
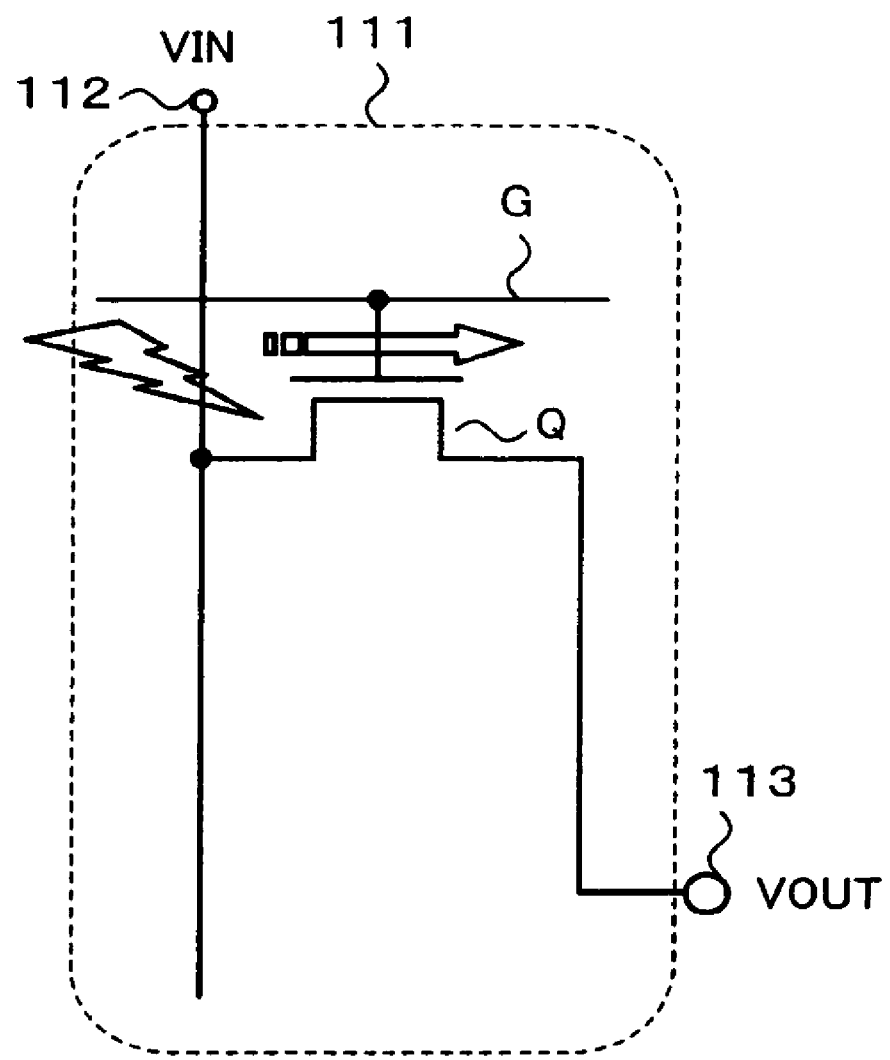
FIG. 7 is a schematic diagram showing connections of an equivalent circuit of a backlight luminance sensor according to an embodiment of the present invention.

FIG. 7 shows a structure of a backlight luminance sensor 111. Q represents a transistor of the backlight luminance sensor 111. A gate of the transistor Q is connected to a gate line G. A source of the transistor Q is connected to a terminal 112. A voltage $V_{IN}$ is supplied to the terminal 112. A drain of the transistor Q is connected to a terminal 113. An output voltage $V_{OUT}$ is obtained from the terminal 113.

Figure 8:
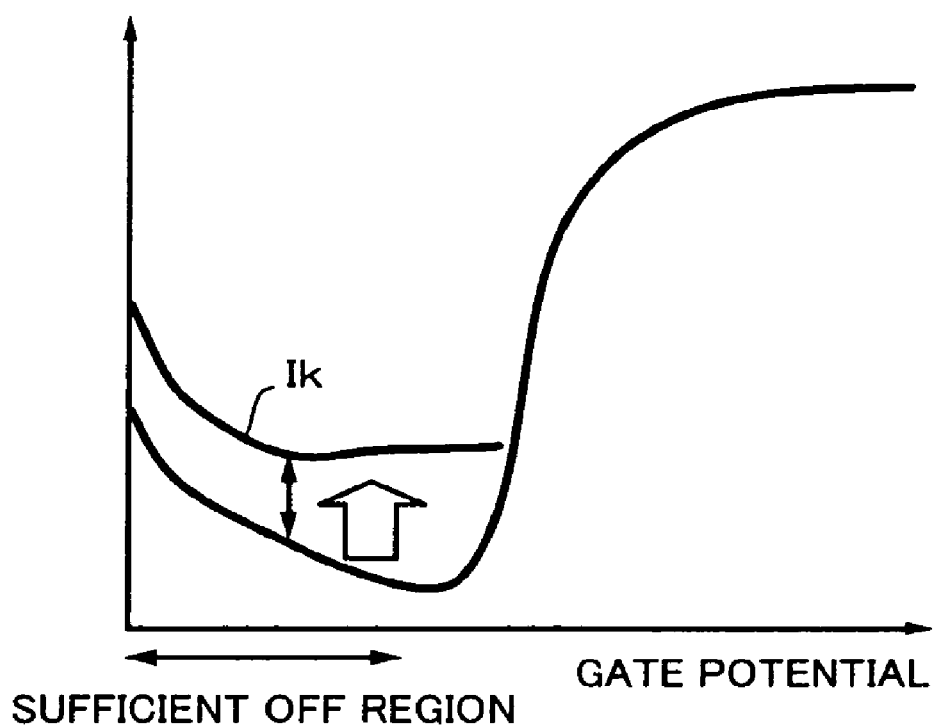
FIG. 8 is a schematic diagram showing characteristics of the backlight luminance sensor according to the embodiment of the present invention.

The transistor Q is an N channel MOS type transistor like the pixel transistor Tr. The transistor Q and the transistor Tr of the pixel portion are formed in the same process on the same substrate. The transistor Q has characteristics as shown in FIG. 8. The horizontal axis and the vertical axis of FIG. 8 represent a gate potential and a drain current, respectively. In this case, the relationship of (gate potential=potential of gate line G−potential of $V_{IN}$) is satisfied. The drain current is a current that flows in the transistor Q, namely a current that flow between the terminals 112 and 113.

With the gate potential, the transistor Q always has a sufficient off region. In the sufficient off region, when rays of backlight irradiate the transistor Q, an off current Ik (also called a leak current) occurs due to light excitation. The value of the off current Ik corresponds to the luminance of the rays of backlight that irradiate the transistor Q. Thus, with the output voltage $V_{OUT}$ into which the off current Ik is converted, the luminance of the backlight can be detected. The channel width and so forth of the transistor Q are different from those of the pixel transistor so that the off current of the transistor Q can be dynamically varied.

Figure 9:
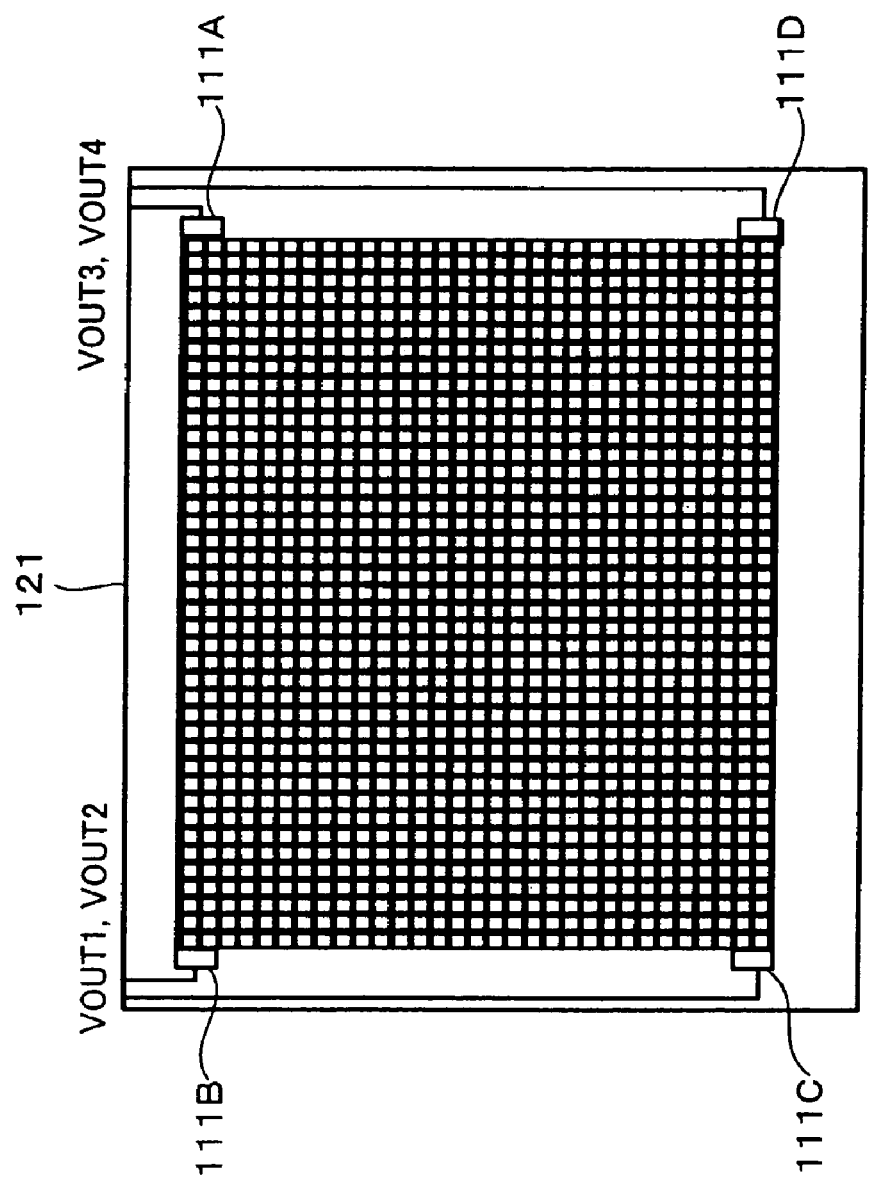
FIG. 9 is a schematic diagram showing an example of the positions of the backlight luminance sensors according to the embodiment of the present invention.

For example, as shown in FIG. 9, backlight luminance sensors 111A, 111B, 111C, and 111D are disposed in the vicinity of four outer corners of the effective screen of an LCD panel 121. The backlight luminance sensors 111A to 111D detect the luminance of each of the three primary colors. As shown in FIG. 3, the backlight unit is composed of the three-primary color LED array 104 and the optical diffusion unit 105.

Alternatively, the backlight luminance sensors may be disposed at four inner corners of the effective screen. The effective screen is a region in which pixels are disposed. Alternatively, backlight luminance sensors may be disposed at more positions than the four corners. When the integration of LCD panel 121 can be increased using for example low temperature polysilicon process, the backlight luminance sensors can be disposed to individual pixels. In this case, the luminance of the backlight can be measured from the entire region of the effective screen.

Figure 10:
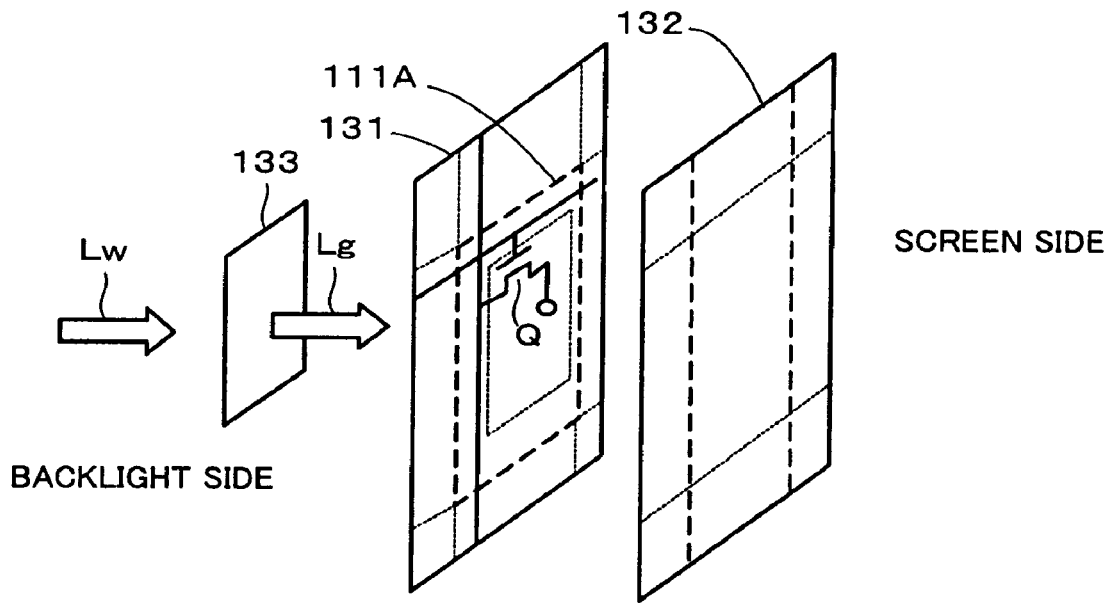
FIG. 10 is a perspective view showing a structure of a backlight luminance sensor portion according to the embodiment of the present invention.

FIG. 10 shows a green light detection sensor of one backlight luminance sensor, for example, 111A. In FIG. 10, a TFT substrate 131 is disposed on the backlight side. A TFT and a backlight luminance sensor are formed on the TFT substrate 131. An opposite substrate 132 is disposed opposite to the TFT substrate 131 with a liquid crystal material (not shown) interposed therebetween. The relationship of this arrangement is pattern B shown in FIG. 2. The size of each of the substrates 131 and 132 is the same as the size of one screen. However, for easy understanding, only one backlight luminance sensor is illustrated.

White light Lw emitted from the backlight unit passes through a color (for example a green) filter film 133. The color filter film 133 transmits green light Lg. In FIG. 10, the color filter film 133 is spaced apart from the TFT substrate 131. Actually, the color filter film 133 adheres to the TFT substrate 131. The color filter film 133 adheres to a light transmission portion of the backlight luminance sensor that detects the luminance of green light with which the TFT substrate 131 is irradiated.

In addition, backlight luminance sensors (transistors) (not shown in FIG. 10) that detect the luminance of red light and blue light of the white light Lw are disposed.

As shown in FIG. 9, the backlight luminance sensors 111A to 111D are disposed around or inside the effective screen. In this case, these backlight luminance sensors 111A to 111d need to appear to be a black image so that the person who watches the screen, namely, the observer, does not feel that the picture quality deteriorates. If the backlight luminance sensor portions always appear to be white or with three primary colors, the observer recognizes them to be bright dots. Thus, the observer seems that the picture quality deteriorates.

Thus, in FIG. 10, at least the opposite substrate 132 that is opposite to the light transmission portion of the backlight luminance sensor 111A is a light shield region. In this case, the backlight luminance sensor portion may be shielded with a member made of resin such as a frame of the housing of the LCD display apparatus instead of the opposite substrate 132. When the backlight luminance sensor portion is permitted to always appear to be white, it is not necessary to light shield it.

Figure 11:
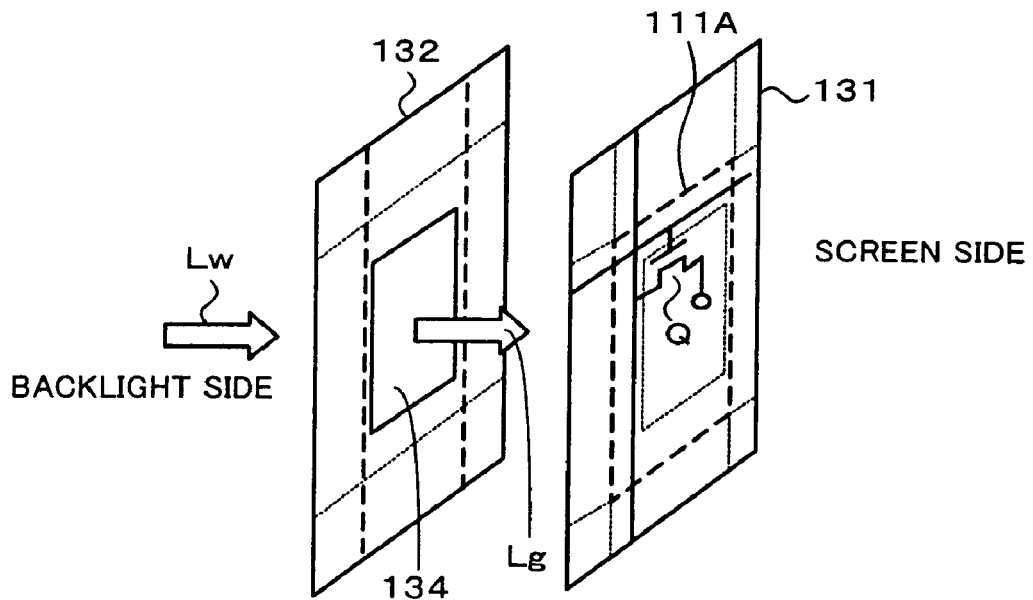
FIG. 11 is a perspective view showing a structure of a backlight luminance sensor portion according to another embodiment of the present invention.

FIG. 11 shows another embodiment of the present invention. According to the other embodiment, an opposite substrate 132 is disposed on the backlight side. A TFT substrate 131 is disposed on the screen side with a liquid crystal material (not shown) interposed therebetween. The relationship of the arrangement of the opposite substrate 132 and the TFT substrate 131 is pattern A shown in FIG. 2. The size of each of the TFT substrate 131 and the opposite substrate 132 is the same as the size of one screen. However, for easy understanding, only one backlight luminance sensor is illustrated.

A green filter 134 is disposed in a region corresponding to a green light detection transistor of the backlight luminance sensor 111A of the opposite substrate 132. White light Lw emitted from the backlight unit passes through the green filter 134. The green filter 134 transmits green light Lg. The green light Lg passes through a liquid crystal material (not shown) and irradiates a transistor Q of the backlight luminance sensor 111A. Alternatively, light that passes through a color filter disposed on the opposite substrate 132 may irradiate the backlight luminance sensor 111A.

Figure 12:
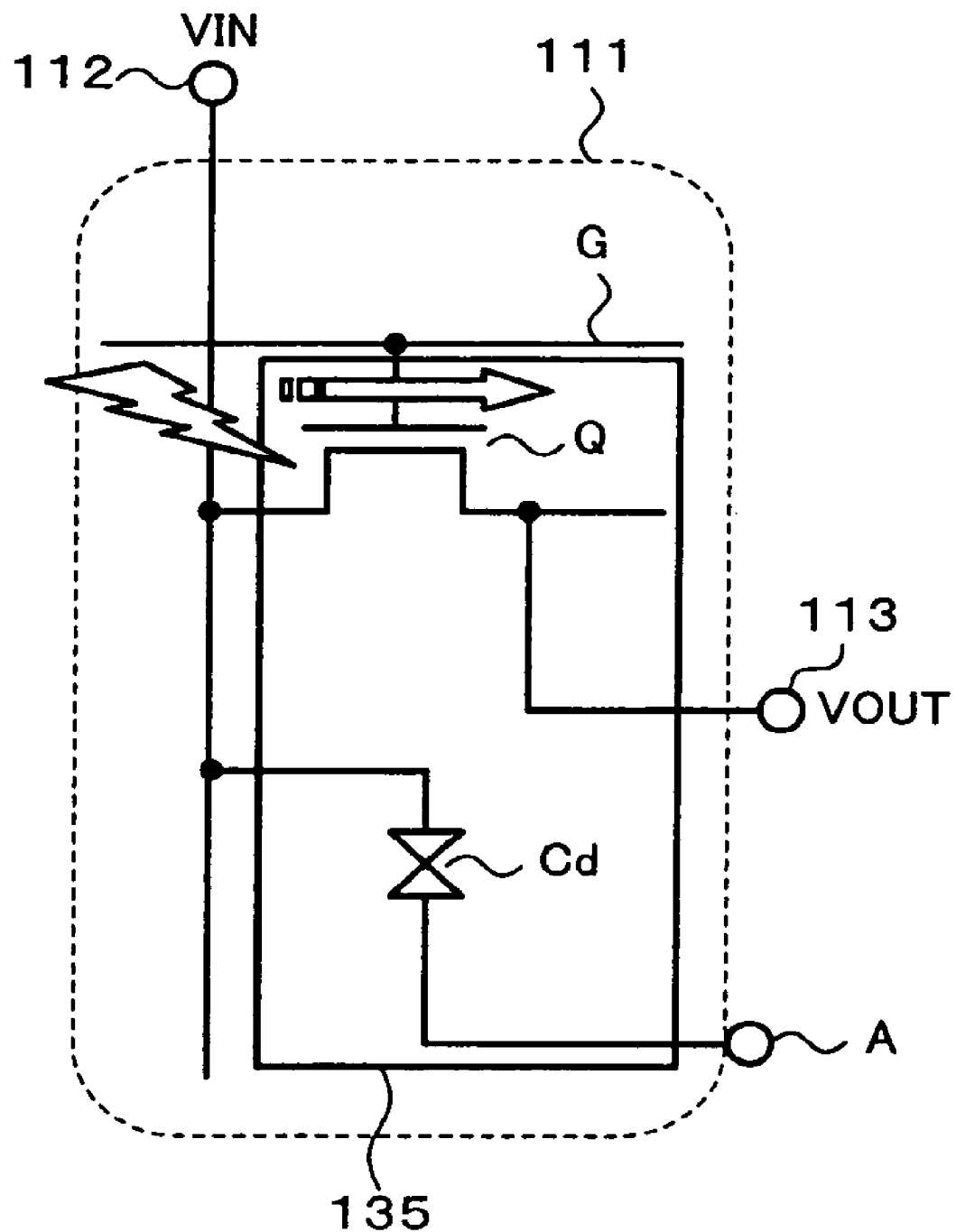
FIG. 12 is a schematic diagram showing connections of an equivalent circuit of a backlight luminance sensor according to the other embodiment of the present invention.

FIG. 12 shows a structure of the backlight luminance sensor 111 according to another embodiment. Q represents a transistor of the backlight luminance sensor 111. A gate of the transistor Q is connected to a gate line G. A source of the transistor Q is connected to a terminal 112. A voltage $V_{IN}$ is supplied to the terminal 112. A drain of the transistor Q is connected to a terminal 113. An output voltage $V_{OUT}$ is obtained from the terminal 113. A liquid crystal capacitor Cd exists between the source of the transistor Q and an opposite electrode A.

Like the pixel transistor Tr, the transistor Q is an N channel MOS type transistor. The transistor Q and the transistor Tr of the pixel portion are formed in the same process. As described above, with a gate voltage, the transistor Q always has a sufficient off region. In the sufficient off region, when rays of the backlight irradiate the transistor Q, an off current Ik occurs due to light excitement. The value of the off current Ik corresponds to the luminance of the rays of backlight that irradiate the transistor Q. Thus, with the output voltage $V_{OUT}$ into which the off current Ik is converted, the backlight luminance can be detected.

In FIG. 12, reference numeral 135 represents an opening portion. The opening portion 135 of the opposite substrate 132 cannot be light shielded. When the opening portion 135 is light shielded in the arrangement shown in FIG. 11, the rays of backlight do not irradiate the transistor Q of the backlight luminance sensor. Thus, a sense time that the observer cannot recognize is set.

Figure 13:
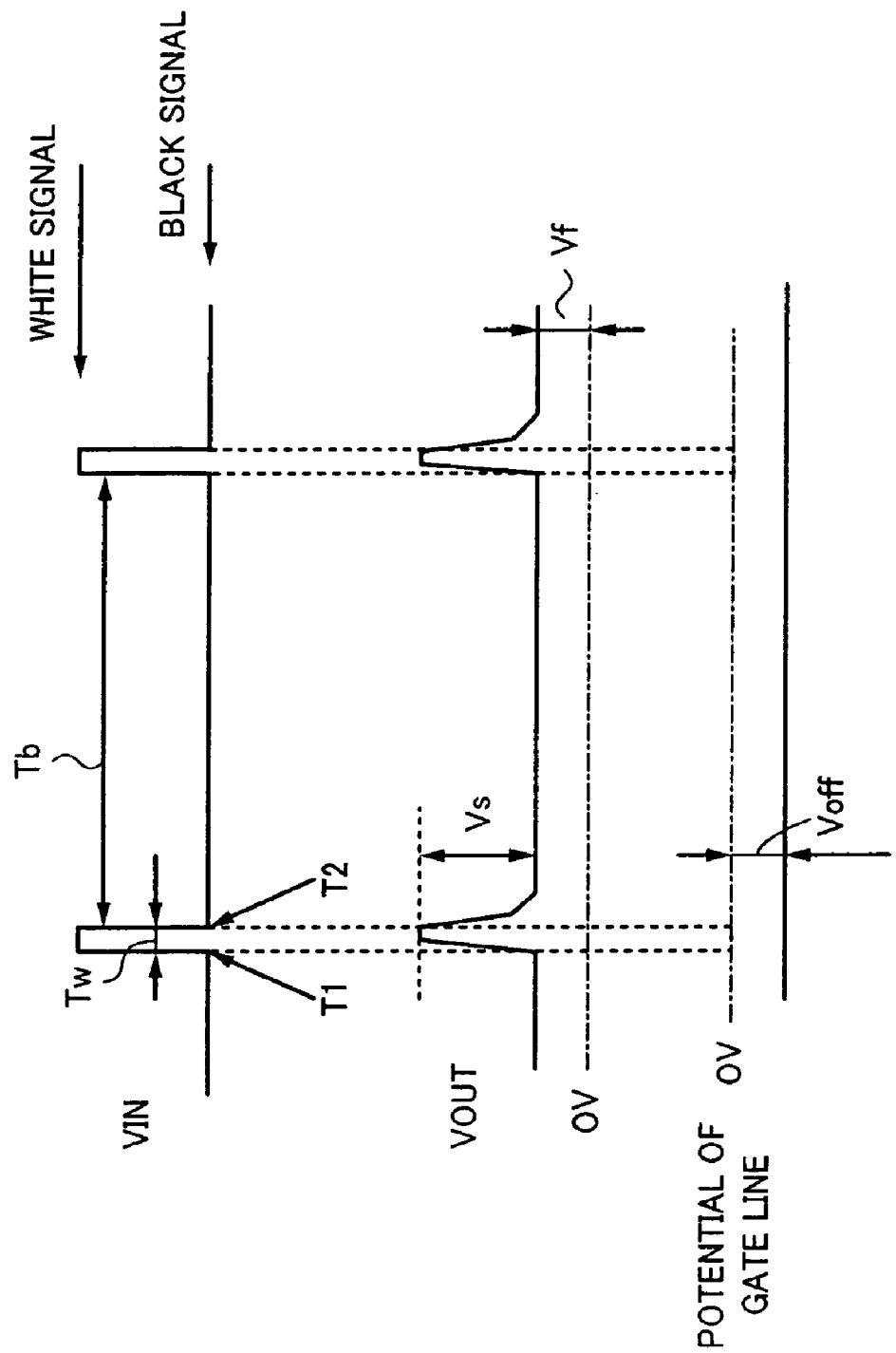
FIG. 13 is a timing chart describing the operation of the other embodiment of the present invention.

FIG. 13 shows an example of timing at which the luminance of backlight is detected. FIG. 13 shows an input voltage $V_{IN}$, an output voltage $V_{OUT}$, and a gate line potential in the order. The gate line potential is a minus potential $V_{off}$ that is lower than the threshold voltage of the transistor Q. The gate line potential is a level at which the transistor Q is sufficiently turned off.

In the structure of the connections shown in FIG. 12, the input voltage $V_{IN}$ is applied to the liquid crystal interposed between the TFT substrate 131 and the opposite substrate 132. The input voltage $V_{IN}$ sets a white signal (a signal that causes the liquid crystal to transmit light) and a black signal (a signal that causes the liquid crystal to shield light) on the basis of the potential of the opposite electrode A. Assuming that the sum of the period Tb of the black signal and the period Tw of the white signal is a measurement interval, the period Tw is sufficiently short in the measurement interval. The measurement interval depends on the drive method of the LCD and the performance of the transistor. In the LCD composed of amorphous transistors, the measurement interval is preferably in the range from several microseconds to ten several milliseconds. The period Tw of the white signal is selected so that the observer is not bothered by a white image (flickering).

When the level of the white signal is applied as the input voltage $V_{IN}$ in the period Tw, the liquid crystal transmits light. As a result, the green light Lg that passes through the color filter 134 irradiates the transistor Q of the backlight luminance sensor 111A. The transistor Q generates the detected voltage Vs as the output voltage $V_{OUT}$. With the level of the detection voltage Vs, the luminance level of the backlight can be detected. The output voltage $V_{OUT}$ contains the offset voltage Vf.

As shown in the timing chart shown in FIG. 13, the short time Tw that the observer cannot recognize is set as a sense time. In the other period, a potential for black is applied to the backlight luminance sensor. According to the embodiment shown in FIG. 11, not only the optical characteristics of the backlight, but the luminance of the backlight including the optical characteristics of the LCD color filter disposed on the opposite substrate 132 can be detected.

In the arrangement shown in FIG. 11, a frame may be disposed around the screen of the liquid crystal display apparatus on the screen side of the TFT substrate 131 so that the frame shields light.

Figure 14:
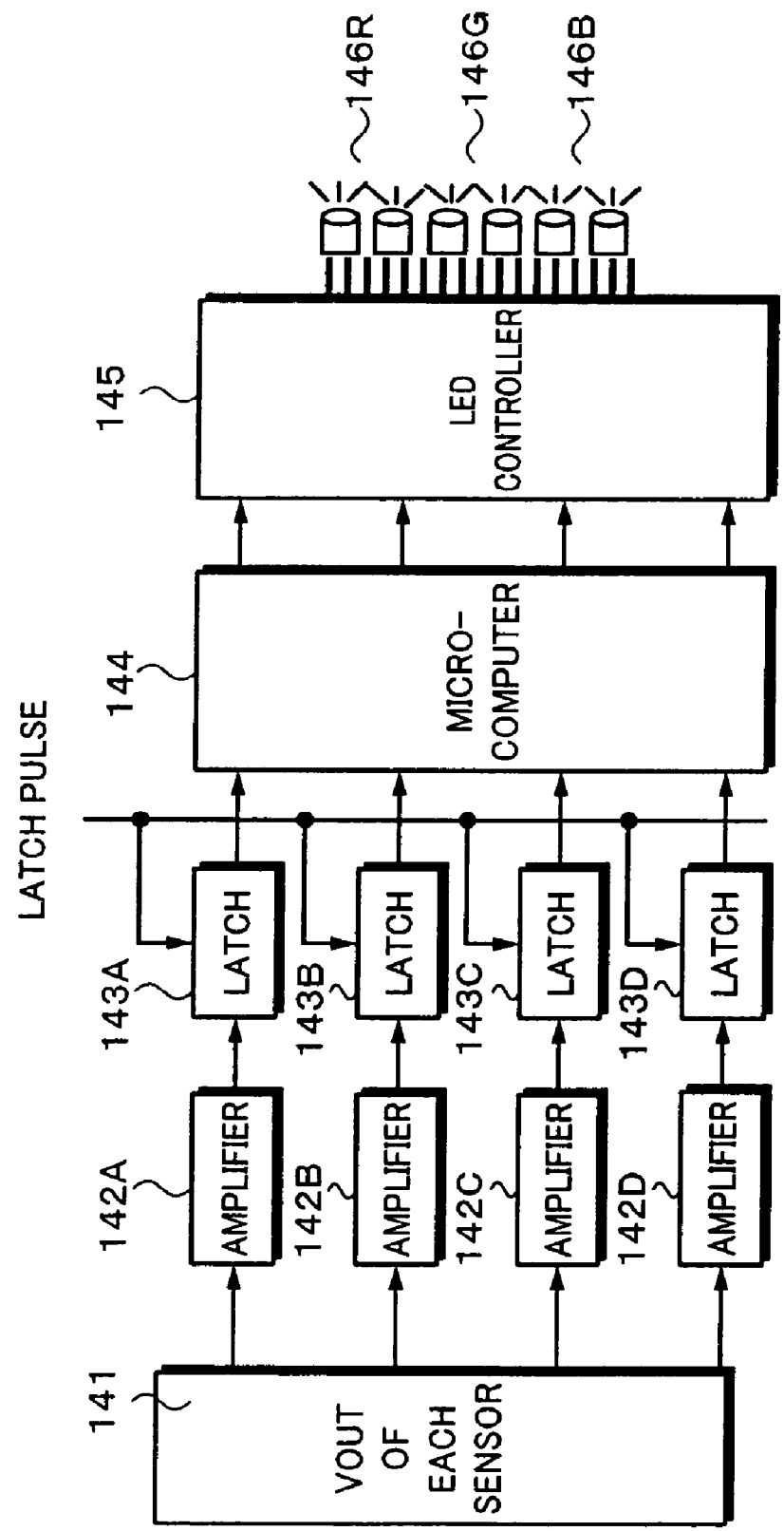
FIG. 14 is a block diagram showing a structure for a process for an output voltage of the backlight luminance sensor according to the present invention.

FIG. 14 shows an example of a structure of a system that processes an output signal of a backlight luminance sensor. This system can be applied to both the foregoing embodiments. For example, detection voltages of the backlight luminance sensors disposed at four corners of the screen shown in FIG. 9 are supplied to amplifiers 142A, 142B, 142C, and 142D. Output voltages of the amplifiers 142A, 142B, 142C, and 142D are supplied to latches 143A, 143B, 143C, and 143D. The latches 143A to 143D are circuits that latch levels of detection voltages at predetermined timing defined with latch pulses. The latches 143A to 143D are composed of for example sample hold circuits.

Output signals of the latches 143A to 143D are supplied to a microcomputer 144. The microcomputer 144 generates a compensation signal that keeps the luminance of the backlight constant. The compensation signal is supplied to an LED controller 145. The LED controller 145 generates a drive current to drive a red LED group 146R, a green LED group 146G, and a blue LED group 146B.

The amplifier 142A and the latch 143A have signal paths corresponding to rays of three primary colors. Likewise, the amplifiers 142B, 142C, and 142D and the latches 143B, 143C, and 143D have signal paths corresponding to rays of three primary colors.

Figure 15:
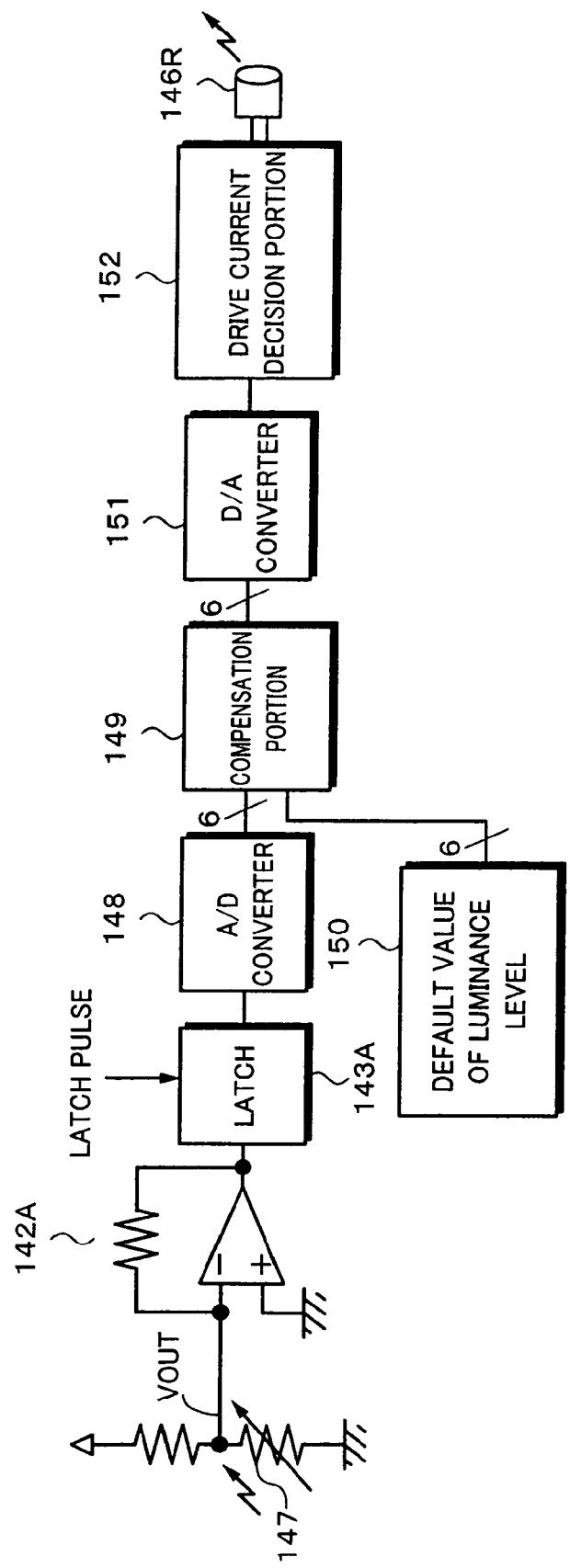
FIG. 15 is a block diagram showing details of a part of the structure for the process for the output voltage of the backlight luminance sensor according to the present invention.

FIG. 15 shows an example of one signal path of the system shown in FIG. 14. The off current of the transistor Q of the backlight luminance sensor varies with light as a variable resistor 147. The backlight luminance sensor is for example a red light sensor. The output voltage $V_{OUT}$ of the backlight luminance sensor is supplied to the latch 143A through the amplifier 142a. The value of the detection voltage of the output voltage $V_{OUT}$ is latched by the latch 143A.

An output of the latch 143A is converted into a digital detection signal of for example six bits by an A/D converter 148. The digital detection signal of six bits is supplied to a compensation portion 149. A default value 150 of a luminance level held in a hold portion 150 is supplied to the compensation portion 149. The default value of the luminance level can be freely set.

The compensation portion 149 compares the value of the digital detection signal with the default value and repeats an addition or a subtraction until they become equal. The compensation portion 149 detects the difference between the digital detection signal and the default value and outputs a digital difference signal of six bits. A D/A converter 151 outputs the digital difference signal as an analog compensation signal.

The A/D converter 148, the hold portion 150, the compensation portion 149, and the D/A converter 151 represent functions as blocks, the functions being accomplished by the microcomputer 144 shown in FIG. 14. The analog difference signal is supplied from the D/A converter 151 to a drive current decision portion 152. The drive current decision portion 152 detects a drive current. The drive current decision portion 152 corresponds to the LED controller 145 shown in FIG. 14.

The drive current decision portion 152 decides a drive current of the red LED group 146R. The red LED group 146R lights with the drive current. In the structure shown in FIG. 15, a drive current of the red LED group 146R is decided with the luminance detected by one backlight luminance sensor. In this case, the luminance of an LED in the vicinity of the backlight luminance sensor is controlled. When the duty ratio control circuit 16 and the PWM generation circuit 13 are disposed as shown in FIG. 16, the output of the D/A converter 151 may be directly input to the duty ratio control circuit 16. In this case, the drive current decision portion 152 is omitted.

In the arrangement shown in FIG. 9, by dividing the length and breadth of the screen are divided by two each, four divided regions are obtained. The LED groups of the LED unit are divided so that they correspond to the four divided regions. Drive currents formed with the detection signals of the backlight luminance sensors are supplied to LEDs of the groups. When the output voltage $V_{OUT}$ shown in FIG. 15 is the output of the backlight luminance sensor 111A (see FIG. 9), the red LED group 146R is an LED group corresponding to the upper right region of the four divided regions.

The process that correlates the positions of the backlight luminance sensors and the positions of the LED groups is an example. Alternatively, optimum drive currents may be generated by combining output signals of the backlight luminance sensors. For example, compensation signals formed of two luminance sensors may be linearly interpolated so as to generate compensation signals of individual portions of the screen.

In the structure shown in FIG. 14, in a device such as a low temperature polysilicon, when peripheral circuits such as the amplifiers 142A to 142D and the latches 143A to 143D and the TFTs are formed on the same substrate, the peripheral circuits may be integrated with an LCD panel.

It should be understood by those skilled in the art that various modifications, combinations, sub-combinations and alternations may occur depending on design requirements and other factors insofar as they are within the scope of the appended claims or the equivalents thereof.

For example, when a white fluorescent lamp is used instead of three color LEDs, an AC pulse voltage supplied to the fluorescent lamp may be varied corresponding to the analog difference signal.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A liquid crystal display apparatus comprising:
a liquid crystal interposed between a first substrate and a second substrate;
a backlight as a white color light source for the liquid crystal;
a luminance sensor and a thin film device as pixels being formed on the first substrate in a same process, wherein the luminance sensor detects a luminance of the backlight;
a control circuit that generates a drive signal to maintain the luminance of the backlight at an almost constant level with respect to time based on a detection signal detected by the luminance sensor;
an input signal generation portion that generates an input signal having a repetitive period that is shorter than a period for which the liquid crystal transmits light without recognition of flickering, the input signal generation portion supplying the input signal to the thin film device; and
a sample hold portion that holds a detection signal of the luminance sensor,
wherein the control circuit that generates the drive signal to maintain the luminance of the backlight at the almost constant level with respect to time is based on the detection signal held by the sample hold portion, and the second substrate opposite to the first substrate on which the thin film device is formed is disposed on the backlight side when viewed from the liquid crystal.

2. The liquid crystal display apparatus as set forth in claim 1, wherein the sample hold portion is formed on the first substrate on which the thin film devices is formed.

3. The liquid crystal display apparatus as set forth in claim 1, wherein the backlight includes a light emitting device array configured to generate mixed white light.

4. The liquid crystal display apparatus as set forth in claim 3, wherein the mixed white light includes at least a component of blue light emitted from a blue light emitting diode.

5. The liquid crystal display apparatus as set forth in claim 3,
wherein color filters corresponding to at least three different colors components of the mixed white light are disposed on one of the two substrates,
wherein the luminance sensors are disposed corresponding to the light emitting devices and detect the luminance of each of the at least three different color components of the mixed white light, and
wherein the control circuit generates drive signals for the light emitting devices corresponding to the luminance of each of the color components.

6. The liquid crystal display apparatus as set forth in claim 1, wherein the backlight includes a light emitting device array and a diffusion portion, wherein the diffusion portion diffuses mixed white color light rays emitted from the light emitting device.

7. The liquid crystal display apparatus as set forth in claim 1,
wherein the substrate on which the thin film device is formed when viewed from the liquid crystal side is disposed on the backlight side, wherein at least one luminance sensor is disposed in a screen on which the pixels are foamed, and wherein a light shield portion is disposed on the second substrate so that the light shield portion is opposite to the luminance sensor.

8. The liquid crystal display apparatus as set forth in claim 1,
wherein at least one luminance sensor is disposed outside a screen on which the pixels of the thin film devices are formed, and wherein the liquid crystal display apparatus further comprises a housing that houses the first substrate, the second substrate, the backlight, and the control circuit and that covers the luminance sensor.

9. The liquid crystal display apparatus as set forth in claim 1,
wherein the sample hold portion is formed on the first substrate on which the thin film devices is formed.

10. A method for adjusting a luminance of a mixed white light backlight as a light source, wherein the mixed white light backlight includes a plurality of light emitting devices and one or more thin film devices are formed as a screen on the liquid crystal display panel, and wherein a luminance sensor is disposed on the liquid crystal display panel, the method comprising:

detecting luminance of the backlight;

generating a drive signal based on detection of luminance of the backlight; and driving the light emitting devices with the drive signal generated to maintain the luminance level of the backlight at an almost constant level with respect to time;

generating an input signal having a repetitive period that is shorter than a period for which the liquid crystal transmits light without recognition of flickering and supplying the input signal to the thin film device that composes the luminance sensor;

sample-holding the detected signal of the luminance sensor based on the input signal;

generating a drive signal based on the signal detected during sample holding; and driving the light emitting devices with the drive signal generated to maintain the luminance of the backlight at an almost constant level.

11. The method for adjusting a luminance of a mixed white light backlight as set forth in claim 10, wherein the mixed white light includes at least a component of blue light emitted from a blue light emitting diode.

* * * * *